US 8,839,419 B2

(12) United States Patent
Hudis et al.

(10) Patent No.: US 8,839,419 B2
(45) Date of Patent: Sep. 16, 2014

(54) DISTRIBUTIVE SECURITY INVESTIGATION

(75) Inventors: Efim Hudis, Bellevue, WA (US); Yair Helman, Hafia (IL); Tomer Weisberg, Hafia (IL); Oren Yossef, Hafia (IL); Ziv Rafalovich, Hafia (IL)

(73) Assignee: Microsoft Corporation, Redmond, WA (US)

( * ) Notice: Subject to any disclaimer, the term of this patent is extended or adjusted under 35 U.S.C. 154(b) by 1334 days.

(21) Appl. No.: 12/098,416

(22) Filed: Apr. 5, 2008

(65) Prior Publication Data
US 2010/0031354 A1 Feb. 4, 2010

(51) Int. Cl.
G06F 21/00 (2013.01)
G06F 21/57 (2013.01)
G06F 21/55 (2013.01)
H04L 29/06 (2006.01)

(52) U.S. Cl.
CPC .............. *G06F 21/577* (2013.01); *G06F 21/55* (2013.01); *H04L 63/20* (2013.01)
USPC ..................... 726/22; 726/23; 726/24; 726/25

(58) Field of Classification Search
None
See application file for complete search history.

(56) References Cited

U.S. PATENT DOCUMENTS

| | | | |
|---|---|---|---|
| 5,748,083 A | 5/1998 | Rietkerk | |
| 7,085,359 B2 | 8/2006 | Crites et al. | |
| 7,096,498 B2 * | 8/2006 | Judge | 726/22 |
| 7,146,644 B2 * | 12/2006 | Redlich et al. | 726/27 |
| 7,159,237 B2 * | 1/2007 | Schneier et al. | 726/3 |
| 7,197,563 B2 | 3/2007 | Sheymov et al. | |
| 7,237,264 B1 * | 6/2007 | Graham et al. | 726/23 |
| 7,322,047 B2 * | 1/2008 | Redlich et al. | 726/27 |
| 7,340,768 B2 * | 3/2008 | Rosenberger | 726/4 |
| 7,472,421 B2 * | 12/2008 | Cummins | 726/25 |
| 7,506,360 B1 * | 3/2009 | Wilkinson et al. | 726/3 |
| 7,774,361 B1 * | 8/2010 | Nachenberg et al. | 707/779 |
| 2002/0066034 A1 | 5/2002 | Schlossberg et al. | |
| 2003/0051026 A1 * | 3/2003 | Carter et al. | 709/224 |
| 2003/0212909 A1 | 11/2003 | Chandrashekhar et al. | |
| 2005/0004863 A1 | 1/2005 | Havrilak | |
| 2005/0251862 A1 * | 11/2005 | Talvitie | 726/24 |
| 2006/0248591 A1 | 11/2006 | Day et al. | |
| 2008/0016569 A1 | 1/2008 | Hammer et al. | |
| 2008/0276317 A1 * | 11/2008 | Chandola et al. | 726/23 |

OTHER PUBLICATIONS

Bottino, Louis J. Security Measures In A Secure Computer Communications Architecture. 2006 IEEE/AIAA 25th Digital Avionics Systems Conference. Pub. Date: 2006. Relevant pp. 1-18. http://ieeexplore.ieee.org/stamp/stamp.jsp?tp=&arnumber=4106339.*

(Continued)

*Primary Examiner* — Dede Zecher
*Assistant Examiner* — Jeremiah Avery
(74) *Attorney, Agent, or Firm* — Ben Tabor; Kate Drakos; Micky Minhas

(57) ABSTRACT

A security investigation system uses a central server to distribute requests for security information regarding an asset, receive responses, and manage the information in the responses in a case object. Requests may be distributed to various servers, each of which may have an agent that may receive the request, search various databases, logs, and other locations, and generate a response. A case object may be continually updated in some embodiments. The case object may be viewed, analyzed, and other requests generated using automated or manual tools. A case object may be sanitized for analysis without compromising sensitive information.

20 Claims, 3 Drawing Sheets

(56) References Cited

OTHER PUBLICATIONS

Thompson, Mary., "Distributed Security Architectures", Retrieved at <<http://www.doecollaboratory.org/research2/security/DistSecSummary.pdf>>, Jan. 6, 2009, pp. 3.

"i Policy Security Manager", Retrieved at <<http://www.ipolicynetworks.com/products/securitymanager_overview.html>>, Retrieved Date: Jan. 20, 2012, pp. 2.

"Insight into Security Information and Event Management", Retrieved at <<http://partners.corero.com/pdf/TLN_NSA_DataSheet.pdf>>, Retrieved Date: Jan. 20, 2012, pp. 4.

* cited by examiner

DISTRIBUTIVE SECURITY INVESTIGATION

BACKGROUND

Security related information on networked computer systems is often a very small amount of useful information within a very large amount of data. Sorting and sifting the useful information relating to a specific security issue can be problematic when large numbers of computer systems are involved.

For enterprise security management where several thousand or tens of thousands of computer systems are being managed, investigating a security issue may involve extraordinary amounts of data.

SUMMARY

A security investigation system uses a central server to distribute requests for security information regarding an asset, receive responses, and manage the information in the responses in a case object. Requests may be distributed to various devices, each of which may have an agent that may receive the request, search various databases, logs, and other locations, and generate a response. A case object may be continually updated in some embodiments. The case object may be viewed, analyzed, and other requests generated using automated or manual tools. A case object may be sanitized for analysis without compromising sensitive information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
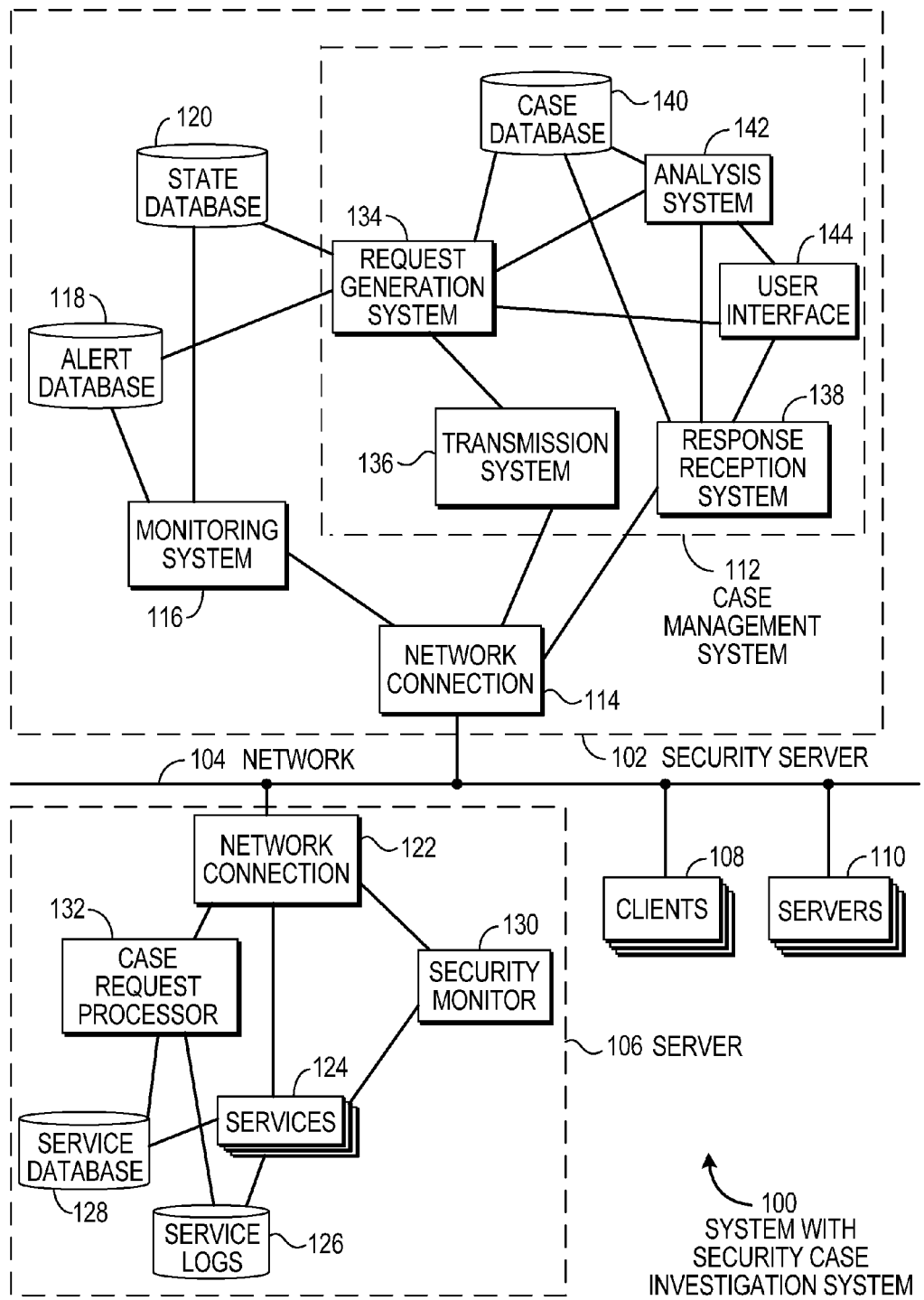
FIG. 1 is a diagram illustration of an embodiment showing a system with a security case investigation system.

A security monitoring and investigation system may collect and analyze data from many different sources. The system may generate a request for any data related to a specific set of assets and time scope and transmit the request to various servers and clients across a network. Each server and client may respond with related data. The related data may be stored as a 'case' that is investigated. The case may be analyzed, further requests sent out, and additional data received and stored in the case object.

The system is a distributed system for gathering data related to a security issue. A centralized server may create a request that is processed by many different devices. The distributed architecture enables a potentially vast amount of data to be filtered and data collected with a high degree of specificity. The collected data may be further analyzed.

An enterprise security system may be made up of many different components. Various servers within an enterprise may contain different types of security components, and each device within an enterprise may also contain various security components. A general device may contain local logs, antimalware or anti-virus detectors, content filters, authentication mechanisms, and other security components.

A server device may contain similar security components and may also contain specific security components tailored to a service or application provided by the server. For example, a messaging server may provide email and other messaging services. Such a server may have advanced security logging, message scanning, and other security components that may be specifically adapted to the messaging application or service hosted on the server.

Each device incorporated into the security monitoring and investigation system may contain a local mechanism for receiving a request and analyzing the various security components on the device. The local mechanism may gather any data relating to the request and transmit the data as a response to a central security server.

The responses may be consolidated and stored in a case object. The case object may be stored and persisted for further analysis. Such analysis may be through a user interaction with the data or may be partially or fully automated. The analysis may spawn other requests that may request data concerning additional assets or may change various modifiers of a previous request. Any responses from the additional requests may be stored in the case object.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for monitoring and investigating security issues. Embodiment 100 is a simplified example of a security monitoring and investigation system that may monitor security status and enable investigation of security issues through a distributed architecture.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a simplified example of an architecture for a distributed security monitoring and investigation system. A centralized security server 102 may connect to a network 104 and monitor and collect security information from a server 106, various client devices 108, and other servers 110.

Embodiment 100 is an example that may illustrate a typical deployment within a local area network. In such a deployment, the network 104 may be a local area network and the servers 106 or 110 may be messaging servers, gateway servers, application servers, or any other type of server. The various clients 108 may be desktop computers, laptop computers, or other devices attached to the local area network.

In other deployments, the network 104 may comprise portions of a wide area network or the Internet. The various servers and clients may be any type of device connected to the network 104 regardless of the type of connection, the performance of the connection, and the physical location of the devices. In some embodiments, the network 104 may contain a wireless network, such as a wireless data network, a wireless telephony network, or some other wireless connections.

The distributed security monitoring and investigation system may be very useful in managing large numbers of devices. For example, an enterprise environment such as a large corporation may have many thousands of devices to manage. Each device may have a different function and a different configuration. In many enterprises, some devices may be designated as servers and may provide a myriad of services or applications to various client devices.

Many devices may have one or more security related applications, services, or other mechanisms that may be useful to analyze when a security issue occurs. A security issue may be any security related problem that may be investigated.

In a network environment with many servers, clients, users, applications, services, and other assets working in an interrelated and interconnected manner, tracking security issues may be an extremely complicated and time consuming task.

For example, a client device may experience a degradation in performance in an application and place a request to a help desk. A service technician may notice that the application is provided by a server and continue to investigate the server, which may provide a service to many client devices. While investigating the server, the technician may suspect a virus or an incorrectly configured client device is accessing the server abnormally frequently, putting a strain on the server and causing the degradation in service.

In the example, a technician investigating a problem may investigate or access many different devices, including the original client device, the server, the client devices serviced by the server, and other servers with which the first server may interact. One or more of the various devices may contribute some portion to the overall security picture.

In another example, a virus may be detected on a client device within a network. A technician investigating the incident may wish to gather information and status from those devices that communicated with the client device. The investigation may trace those devices involved and analyze those devices for any security breach.

The distributed security monitoring and investigation system may enable the technician in the example to send a first request to those devices having involvement with the first client device. The responses to the request may enable the technician to refine, expand, or direct a subsequent request to focus on the server in question, and to query the client devices serviced by the server. Each request may generate responses that contain various status information, action histories, or other information that may be useful in tracking the security issue.

The requests may contain identifiers for the asset or assets in question, and may have various modifiers that may further refine the data being sought. Those devices receiving the request may gather any information that matches the request parameters and issue a response.

The distributed architecture enables a large amount of data to be initially analyzed. In the example above, the two requests may have gathered data from many different client devices and at least one server. The responses may include a small amount of data that may be pertinent to the request.

The security server 102 may perform multiple functions, and may serve as an interface through which security status may be monitored, security investigations may be launched, and data relating to the security investigations may be stored, analyzed, and processed.

The security server 102 may contain a case management system 112 that may perform various security investigations. The security server 102 may also include a monitoring system 116 that may collect security states for many different monitored devices and store those states in a state database 120.

Similarly, any alerts generated by the various devices may be collected and stored in an alert database 118.

A security state may be a classification assigned to a device based on its vulnerability, relative importance, or other factors. A security state may be an overall indicator or summary of a device's security condition and relevance. Each embodiment may have a different definition and classification for security state.

In some embodiments, a security state may be a single parameter with different values or may have multiple parameters with various values. For example, a security state may be defined as high, medium, or low vulnerability and high, medium, or low importance. Using the definition, a device that has a high importance with a medium vulnerability may be overall more serious security risk than a device with low importance and a high vulnerability.

A security alert may be a status update or other indicator that may be generated at a monitored device and transmitted to the security server 102. An example may be an alert generated by anti-virus monitoring software on a laptop computer. The anti-virus software may detect a specific virus and send an alert to the security server 102. In such an example, the anti-virus may attempt to halt or remove the virus and include the results of such an attempt along with the original alert or as a subsequent alert.

The monitoring system 116 may be used to continually gather security information from various monitored devices using active or passive mechanisms. An active gathering mechanism may be one in which the monitoring system 116 initiates a request for information regarding a monitored device. A passive gathering mechanism may be one in which the monitoring system 116 receives information via a message initiated by the monitored device or some other device.

In some embodiments, the monitoring system 116 may gather data directly from a monitored device such as a server or client. Other embodiments may use an intermediate device such as a performance and event monitoring server to gather information about each monitored device. The monitoring system 116 may be a service or function provided as part of such a server. In other embodiments, the monitoring system 116 may gather the security related data from a performance and event monitoring server without communicating directly with the monitored device.

An example of a device configured to operate with the security server 102 is the server 106. Server 106 may contain a network connection 122 and may provide one or more services 124. The services 124 may generate various service logs 126 and may provide information using one or more service databases 128.

The server 106 may also contain a security monitor 130 and a case request processor 132. The security monitor 130 may be a security application or service that performs any type of security function for the server 106. A typical example of a security monitor 130 may be a local, general purpose anti-virus application. In a server application, a security monitor 130 may be a security function that works in conjunction with one or more of the services 124. For example, a security monitor 130 may be design especially to work with a messaging service 124.

The security monitor 130 may provide local monitoring for security breaches and may create an alert and transmit the alert to the monitoring system 116 on the security server 102.

The case request processor 132 may be a function that receives a request from a case management system 112, processes the request, and transmits a response to the case management system 112 on the security server 102. In many embodiments, the case request processor 132 may perform both initial and ongoing monitoring in response to a request.

In some embodiments, a security investigation may analyze historical data as well as monitor ongoing operations. Historical data may refer to data that refers to prior activities. Such data may be found in transaction logs as well as other locations. Ongoing operations may be monitored by tracking current operations and generating a response based on data that are collected.

A service 124 may be any application, service, or function that may be used by another device across the network 104. Examples of services may include messaging services, gateway services, file services, authentication services, and various other applications.

Many services may contain information that may be useful when investigating a security issue. For example, a messaging service may contain records of emails or other messages and communications that may be useful in diagnosing or otherwise investigating a network attack or other security issue.

The case request processor 132 may search various databases 128 that may be used by a service, along with service logs 126 and other elements to find any data that may be related to an asset that is described in a request sent from the case management system 112.

The case management system 112 may facilitate and manage security investigations. Each investigation may be termed a 'case' and the data relating to the case may be stored in a case object. A user may be able to create and manage a case, and various portions of the case management may be semi or fully automated.

During the course of an investigation, security information may be collected and analyzed for various assets. An asset may be any trackable item in a system. Examples of assets may include hardware assets, such as computers, systems, network routing devices, peripheral devices, and other hardware components. Assets may also include software assets, such as software applications, operating systems, software services, remotely provided services, and other software components.

Users may also be considered assets, and users may be identified as individual users, members of specific groups, users of specific assets, or other ways users may be defined. In some cases, a user asset may be a software or service that acts as a human user or operator may act.

An asset may include a data object in various forms. For example, a file or group of files may be considered an asset. In some cases, a portion of a file such as a record in a database may be an asset.

Assets may also include various communication channels and elements relating to communication channels. For example, a connection, session, port, or protocol may be an asset.

A request may be used to gather data that relate to an asset. In an example of an investigation, a port number and protocol may be identified as assets to track. The request may be transmitted to various devices, such as the server 106, that may gather any data related to the port number and protocol defined in the request.

Some requests may identify many different assets and may group the assets together or define the assets in many different manners. Various embodiments may use different expression types, languages, or mechanisms for communicating the type of information desired in the request. For example, some embodiments may use Boolean logic to define the logical sum of two, three, or more assets. Some embodiments may allow the expression of logical OR statements, NOT expressions, and other complex expressions. In some embodiments, a scripting language or other algorithmic expressions may be used.

A request may contain various modifiers that may add description or variables to a request. A modifier may include a definition of the time frame for data of interest. For example, a time range descriptor may be defined using a beginning time and ending time to locate data about events within a period of time. In some requests, a start time may be expressed but no end time. In such requests, a case request processor 132 may collect historical data going back to the start time, and may send current data if an event meeting the criteria of the request occurs.

One modifier that may be added to a request is a level of detail. Some requests may be for a high level of detail and other requests may be for a low level of detail. For example, a first request may gather various messages of a particular type sent by an asset and return a total count of the incidents. A second request may gather the addresses or other data used in one of the communications. A third request may gather data actually transmitted within one of the communications. Each request may have a different level of detail.

Many security investigations may involve communications. As such some embodiments may have modifiers that include session information and various communication parameters. A request may include a session type, session identifier, or other session descriptor information as well as various parameters that may be used to narrow communication investigation. An example of a communication parameter may be a protocol, port, address, or other parameter.

Each embodiment may have different types of assets and different modifiers that may be used. Some embodiments may use only a small number of assets and modifiers, while other embodiments may use many tens or hundreds of asset types and many different modifiers of any type.

A request may be generated by a request generation system 134. The request generation system 134 may generate requests based on data derived from the state database 120 and alert database 118. The request generation system 134 may analyze various alerts and device states to generate a prioritized list of issues to process. Issues with a high priority may be candidates for beginning an investigation.

In many embodiments, a user interface 144 may be used to display various security issues and enable a user to select an issue and create a request based on the issue. The user may be presented with various options and mechanisms that may be used to create the request.

A user may be able to issue or input commands to the request generation system 134 that launch an investigation, modify an ongoing investigation, assign or adjust modifiers, or otherwise control the investigation. Additionally, the user interface 144 may be used to presenting and analyzing results.

In other embodiments, the request generation system 134 may generate requests automatically based on an analysis of the state database 120 and alert database 118. Various algorithms, heuristics, logic, artificial intelligence, or other mechanisms may be used to identify a candidate for investigation and begin an investigation without human interaction.

In still other embodiments, the request generation system 134 may generate a request based on input from a client device 108. A user on a client device 108 may create a request and transmit the request to the case management system 112. In some embodiments, a request may originate on a client device 108, but responses may be gathered by the case management system 112.

The request generation system 134 may create a case object and store the case object in the case database 140. A case object may be a repository of data relating to a case under investigation. In many cases, two, three, or more requests may be generated and many responses received. All of the information collected may be stored in a case object. The case object may be analyzed, compared, and processed as a unit.

The request generation system 134 may create a request and the transmission system 136 may transmit the requests to various servers, clients, and other devices connected to the network 104. In some instances, the transmission system 136 may send a broadcast message that is received by more devices than can process the request. In other instances, the transmission system may send individual messages to those devices capable of receiving and processing the request.

Many different devices may be capable of processing a request. Such devices may include server computers, client computers, portable devices such as mobile phones, handheld scanners, laptop computers, or other device. In some cases, the devices may be network devices, such as gateways, routers, hubs, switches, or other network devices.

Some servers may contain relevant data from applications or services that are provided by the server. For example, a messaging server or email server may process many different types of communications that may indicate the presence of viruses or other security issues. A network gateway server may keep a log of communications between a local area network and a wide area network, and such communication logs may have relevant information about various assets. Similarly, an authentication server may store information about authentication requests and credentials that are often a target of security attacks.

Some networks, especially larger enterprise systems, may have a status management server. A status management server may collect various status information about the operations of other devices. For example, a status management server may collect uptime information, track network usage, and monitor which applications and services are operational on each device. Some status management servers may be used for monitoring and deploying applications, tracking hardware components, and for many different administrative functions. As such, status management servers may contain databases of information that may be useful in a security investigation.

In many embodiments, the devices capable of responding to a request from a case management system 112 may have a software component such as the case request processor 132 operational on the devices. Other embodiments may use various other mechanisms for collecting data from different devices in response to a request.

When a response is transmitted from a device, a response reception system 138 may collect the response, perform some analysis, and store the response data in a case object associated with the response.

In some instances, multiple investigations may be ongoing. The response reception system 138 may match the incoming response with the corresponding case object. In some cases, the response reception system 138 may alert a user via the user interface 144 of updated data.

Some cases may transmit requests to many tens, hundreds, or thousands of devices and each device may potentially transmit a response to the case management system 112. In some instances, an investigation may gather data regarding ongoing or real time operations. In such instances, responses may be generated periodically as events matching the request parameters are detected and data gathered concerning those events.

An analysis system 142 may perform various analyses of a case object. In some embodiments, the analysis system 142 may contain heuristics, algorithms, logic, artificial intelligence, or other mechanisms that may analyze a case object to help identify characteristics or draw conclusions from a case object. The analysis system 142 may perform some analysis and may display some results on the user interface 144. A user may be able to select portions of data, manipulate the data, and create additional requests for the request generation system 134.

In some embodiments, an analysis system may be capable of sanitizing a case object. A sanitized case object may be useful when a case object is sent to a third party for analysis or when the security investigation is performed without exposing a security investigator to sensitive information. In some instances, a case object may be sanitized and sent to a service where case objects from many different enterprises may be consolidated, compared, and analyzed for similarities.

In some embodiments, a case object may contain various sensitive information, such as underlying data, user names, machine names, addresses, and other identifying characteristics. In order to sanitize a case object, each sensitive element may be identified and replaced with a token. The token may be a substitute name for the element, and the token may not include any identifying names or characteristics of the underlying element.

Figure 2:
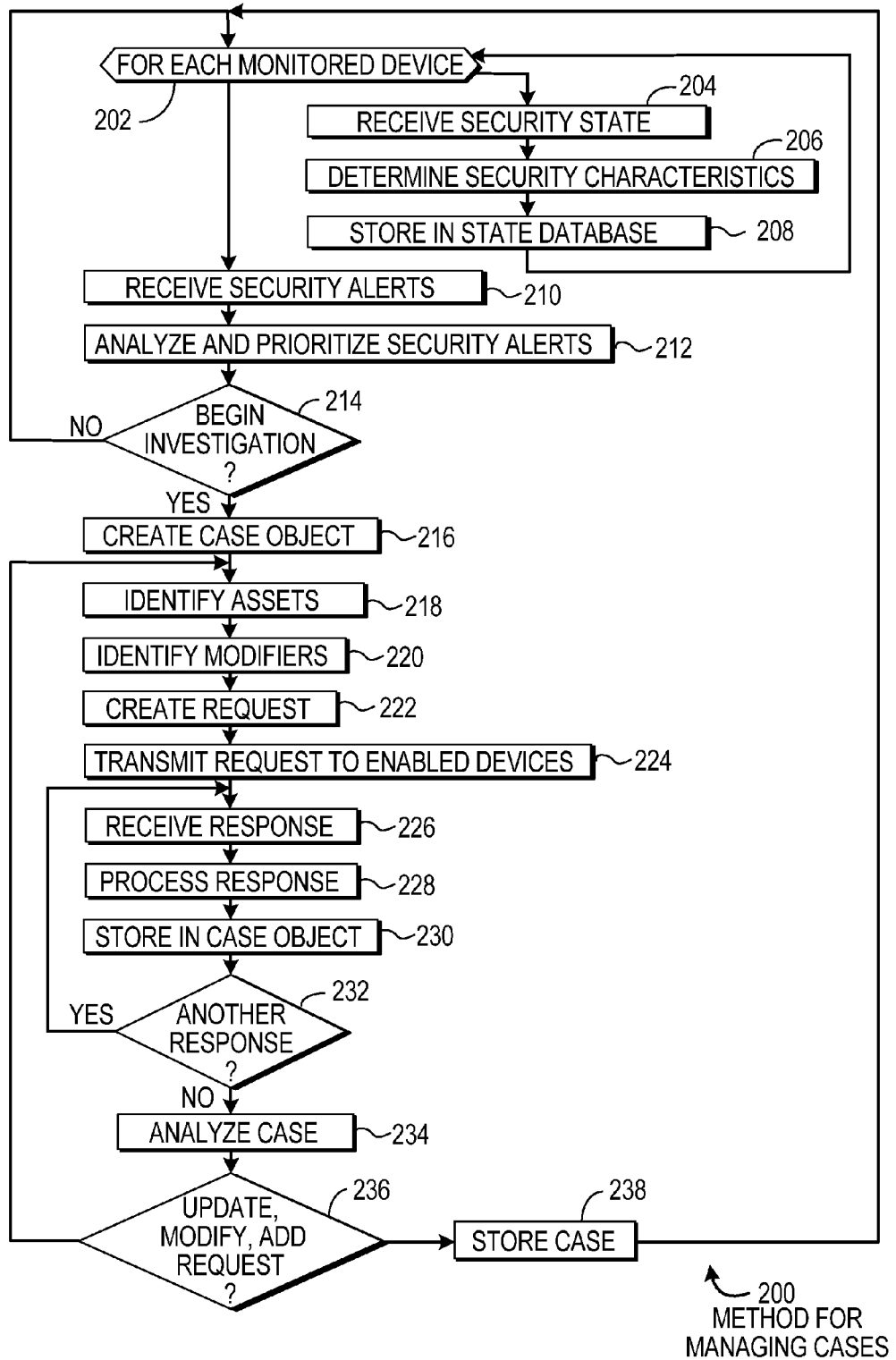
FIG. 2 is a flowchart illustration of an embodiment showing a method for managing cases.

FIG. 2 is a flowchart illustration of an embodiment 200 showing a method for creating and managing security investigation cases. Embodiment 200 illustrates a simplified sequence for managing devices and for creating and managing security investigation cases.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a simplified sequence of a process that may be performed at least in part by a case management system. Information is gathered about monitored devices, including security state and security alerts. The information may be used to launch investigations. An investigation may create a case object, then send out a request for related data to several devices. The devices may process the request, gather data, and return a response. The response may be processed and stored in the case object. Based on the response, additional requests may be transmitted.

A typical embodiment may include a data gathering function, an analysis function, and an investigation function. In the data gathering function, information relating to the various devices may be collected and stored. These data may be periodically analyzed or monitored for any changes that may indicate that a security issue may be present.

A second component of a data gathering function may be the use of security alerts that may be generated by other monitoring systems, including monitoring functions that may be present within the device itself of separate from the device.

An analysis function may be used to identify security issues that have a high priority and that may be ripe for investigation. The investigation function may gather, consolidate, and analyze data regarding a selected security issue.

For each monitored device in block 202, a security state may be received in block 204 and various security characteristics may be determined for the device in block 206. The collected data may be stored in a state database in block 208.

The process of blocks 202 through 208 represent one embodiment of a monitoring system. Each monitored device may be assigned a security state and various security characteristics that may be used to classify the device from a security standpoint. Each embodiment may use different nomenclature, terminology, and different classification mechanisms to define a device's security state. In different embodiments, a set of security states and characteristics may be designed in accordance with the types of devices, types of networks, and types of data being handled on the network.

For example, a manufacturing company may have various clients and servers throughout the company that are used for various functions, such as inventory management, manufacturing floor management, human resources, and accounting. The company may also have Internet-facing systems such as an order processing system and a website. Each function within the company may have different levels of sensitivity to the company and may be protected with different levels of security and with different security mechanisms.

When a monitoring system collects data for the example manufacturing company devices, some devices may have high vulnerability such as the Internet-facing systems. Other devices, such as the manufacturing floor devices, may have low vulnerability since those devices may not be directly accessible to outside networks. In this example, vulnerability is an example of a security characteristic that may be assigned to each device. Some embodiments may have one or more security characteristics that may be assigned to various monitored devices.

A security state may be a condition of the device from a security standpoint. Each embodiment may define security state using different terminology, classifications, and definitions depending on the implementation. A security state change or abnormality may indicate that security related activity has occurred or is occurring. By monitoring security state and changes of security state, a security administrator may be alerted to various security issues.

Security alerts may be received in block 210. Security alerts may be created in response to an event and may be created by other monitoring systems. For example, a firewall security service on a device may encounter several suspicious communications. Based on the communications, the firewall security service may generate an alert and transmit the alert to a security server in real time or near real time.

The security alerts may analyzed and prioritized in block 212. In many cases, a security alert may be prioritized along with a device's security state and security characteristics to prioritize the various security issues. A slight change to the security status of a highly sensitive device may be more important than an intrusion attempt to a device that contains little or no sensitive information, for example.

The blocks 202 through 212 may represent an ongoing or continuous monitoring system that may collect and process security related information. In block 214, an investigation into one of the security issues may be started.

In many cases, high priority security issues from block 212 may be selected for investigation. In some embodiments, an automated mechanism may select an issue and begin an investigation without human intervention. In other embodiments, a user such as a security investigator or administrator may be presented with a prioritized list of security issues from which the user may select one or more to investigate.

After beginning the investigation in block 214, a case object may be created in block 216. The case object may be a storage object in which data relating to the investigation is stored. Data within the case object may be any type of data relevant to the investigation, including data gathered from various devices, the security state and alerts associated with devices involved in the investigation, summary data derived from the data, and any other information. In some embodiments, the case object may include all the information related to the security issue.

Assets relating to the investigation may be identified in block 218. An asset may be any item that may be tracked or queried using a case management request.

In some embodiments, an asset may be a hardware asset such as a computer system, peripheral device, network connection, or other hard asset. Some embodiments may identify user assets by a user name, user group association, user type, or a service or function that behaves like a user. Some embodiments may identify network or communication elements as assets, such as ports, sessions, or other components. Still other embodiments may identify software assets, such as applications, services, or functions. Some embodiments may identify data assets, such as files, databases, records in databases, or other data elements.

A set of modifiers may be identified in block 220 that may limit or expand the desired data relating to the investigation. Modifiers may include Boolean or other logical groupings, sets, or combination of assets or other modifiers to define the desired data. Modifiers may be used to define a time frame for events relating to an asset, for example. A time frame may be defined as a period of time where a security event may have taken place.

Many embodiments may use a scope or level of data to define the depth of detail desired. In some cases, a coarse granularity of data may be desired, especially in an initial request. Subsequent requests may include a finer granularity for desired data along with other limitations.

In some cases, a case management system request may include an ongoing timeframe. When an ongoing time frame is defined, a device that receives a case management system request may process the request on an ongoing basis. In such a situation, the device may monitor activities, gather data, and periodically transmit a response over time. Such responses may be made at regular intervals or at irregular intervals as data is identified.

The assets identified in block 218 and modifiers in block 220 may be used to generate a request in block 222. A request may identify the assets involved in a security investigation and any modifiers that may define the scope or limitations on the data relevant to the investigation.

The request may be transmitted to enabled devices in block 224. In some cases, a request may be broadcast to every enabled device on a network. In some cases, a restriction on the types of devices or groups of devices may be defined.

Some embodiments may transmit requests to each device by individually transmitting a message to each device. In such cases, a modifier of block 220 may define individual devices or subsets of devices that may be applicable to the investigation. Those devices identified by then receive a request.

A response may be received in block 226. In a typical embodiment, individual responses may be received from each device that may have applicable data. In some embodiments, every device that receives a request may respond regardless if the device has any pertinent data.

An incoming response received in block 226 may be processed in block 228 and stored in the case object in block 230. Different embodiments may perform different processing in block 228 depending on the message format, data format, data content, or other features. In some embodiments, an incoming response may undergo extensive processing while in other embodiments, an incoming response may undergo little, or no processing in block 228.

If another response is received in block 232, the process may continue in block 226 to process the next response.

After receiving at least one response, the case object may be analyzed in block 234. The analysis in block 234 may be manual analysis where a user may browse data received and perform various user-initiated analyses. The analysis in block 234 may also be fully automated or semi-automated analysis where various algorithms, logic, scripts, artificial intelligence, or other processing techniques are applied to the data to analyze, sort summarize, or otherwise process the data.

Based on the data analysis, another request may be issued in block 236 by modifying the previous request, updating the request, or adding new limitations, assets, or modifiers. In some cases, a completely new request may be created in block 236.

The decision to create a new or modified request in block 236 may be initiated by a user selection or other user action. In some embodiments, an automated system may create a new request without any user involvement.

When no more requests are to be performed, the case may be stored in block 238. The storage process of block 238 may archive the case for future reference. In some embodiments, previously analyzed cases may be used to compare with current cases under investigation to help draw conclusions or identify similarities in the cases.

Figure 3:
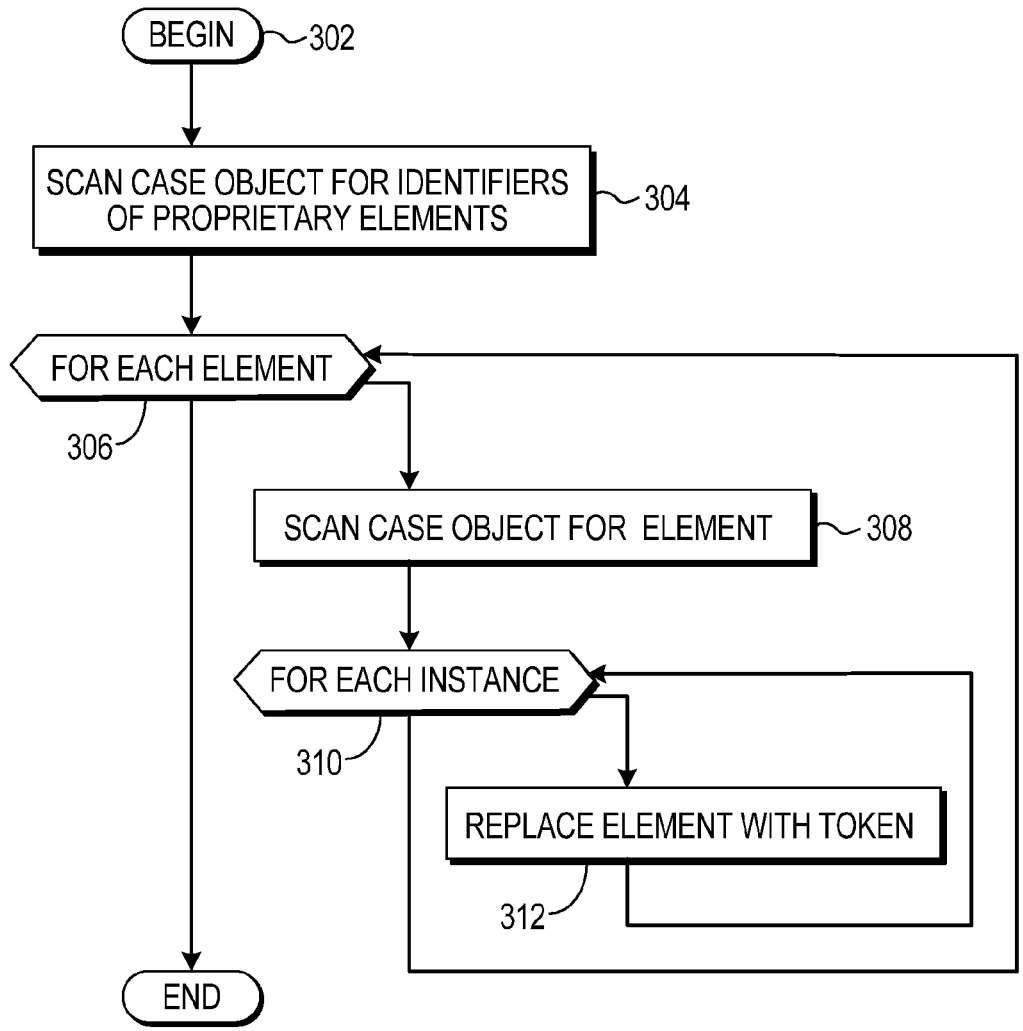
FIG. 3 is a flowchart illustration of an embodiment showing a method for sanitizing a case object.

FIG. 3 is a flowchart illustration of an embodiment 300 showing a method for sanitizing a case object. Embodiment 300 is a simplified example of a method for removing sensitive or proprietary information from a case object.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A sanitized version of a case object may be used to store a case in a manner that may be analyzed and compared to other case objects. In some cases, a company may use sanitized versions of case objects to enable various persons to analyze the investigation without exposing the persons to sensitive or proprietary information.

For example, a case object may be created and sanitized so that the case object may be transmitted to an outside investigative service for analysis. In some embodiments, sanitized case objects may be published for public use and distribution so that other users may share and compare case objects. In such an embodiment, many different shared sanitized case objects may form a public database of security issues that may be used to analyze and compare to current investigations.

The process may begin in block 302.

The case object may be scanned in block 304 for identifiers of proprietary elements. In some embodiments, the scanning of block 304 may be a completely automated process. In other embodiments, a user may select certain elements or types of elements to sanitize while not selecting others. Some embodiments may be semi-automated where some elements are identified automatically and other elements identified by a user.

For each element in block 306, the case object may be scanned for the element in block 308. For each instance in block 310 for the element identified in block 308, the element may be replaced with a token in block 312.

The token may be an identifier for the element that does not contain a specific reference to the underlying proprietary reference. For example, one element that may be considered proprietary is network addresses. A case may include network addresses of 192.0.34.43 and 139.91.1.10. For the first element of 192.0.34.43, each instance may be replaced by a generic address of 1.0.0.1. Similarly, every instance of the next element of 139.91.1.10 may be replaced by a second generic address of 1.0.0.2.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, the computer system including a monitoring system and a case management system, the monitoring system configured to collect security information for one or more other devices, the case management system configured to investigate detected security state changes that occur at the one or more other devices, a method for investigating a security related issue, the method comprising:
    receiving a security alert for a device, the device included in the one or more other devices, the security alert identifying an security related issue that occurred during operation of the device;
    determining that the security related issue is of a sufficient priority to investigate by analyzing the security alert in view of collected security information for the one or more devices;
    investigating the security related issue, including:
        opening an investigation for the security related issue;
        creating a case object for the investigation, the case object being a storage object configured to store information associated with the security related issue;
        formulating a request to send to at least one device from among the one or more devices to request additional information associated with the security related issue, including:
            identifying a plurality of assets related to the investigation;
            adding a modifier to the request to request that additional information be returned with a specified level of detail;
        sending the formulated request to the at least one device to request the additional information about the plurality of assets be returned to the computer system with the specified level of detail;
        receiving one or more responses from the at least one device, the one or more responses responsive to the formulated request, the one or more responses including the additional information about the plurality of assets, the additional information related to the investigation and having the specified level of detail;
        updating the case object by storing the additional information received in the one or more responses in the case object;
        drawing a conclusion with respect to the security related issue by analyzing the updated case object;
        automatically and iteratively refining the updated case object by:
            analyzing the updated case object;
            based on the analysis, automatically and without user intervention, issuing one or more additional requests for further information to the at least one device, the one or more additional requests changing the modifier to request that the requested further information have a different specified level of detail;
            receiving the further information from the at least one device; and
            refining the case object by consolidating the further information along with the additional information in the case object; and
        drawing a further conclusion with respect to the security related issue by analyzing the consolidated information in the refined case object.

2. The method of claim 1, wherein drawing a conclusion with respect to the security related issue comprises determining that further information at a different specified level of detail would aid the investigation; and further comprising:
    formulating a further request to send to the at least one device to request further information associated with the security related issue, including:
        adding a further modifier to the further request to request that further information be returned with the different specified level of detail;
    sending the further request to the at least one device to request the further information about the plurality of assets be returned to the computer system with the different specified level of detail;
    receiving one or more further responses from the at least one device, the one or more further responses responsive to the further request, the one or more further responses including the further information about the plurality of assets, the further information related to the investigation and having the different specified level of detail; and
    further updating the updated case object by storing the further information in the updated case object.

3. The method of claim 1, wherein drawing a conclusion with respect to the security related issue comprises an automated analysis mechanism drawing a conclusion with respect to the security related issue.

4. The method of claim 1, wherein drawing a conclusion with respect to the security related issue comprises drawing a conclusion with respect to the security related issue based at least in part on input received from a user interface.

5. The method of claim 1 further comprising sanitizing the updated case object by:
    identifying an asset identifier in the updated case object; and
    for each instance of the asset identifier in the updated case object, replacing the asset identifier with a token.

6. The method of claim 1, wherein determining that the security related issue is of a sufficient priority to investigate comprises:
    selecting a plurality of security related issues;
    assigning a priority to each of the plurality of security related issues; and
    selecting the security related issue based at least in part on the assigned priorities.

7. The method of claim 1, wherein identifying a plurality of assets related to the investigation comprises identifying one or more of:
    a user;
    a device;
    a communications channel;
    an application; and
    a data object.

8. The method of claim 1, further comprising adding a second modifier to the formulated request to request that returned additional information have specific properties.

9. The method of claim 8, wherein adding a second modifier to the formulated request to request that returned additional information have specific properties comprises adding a second modifier to the formulated request to request that returned additional information be one of:
   within a specified time range;
   have a specified session descriptor; or
   have specified communications parameters.

10. The method of claim 1, wherein identifying the one or more devices comprises identifying one or more of:
   a messaging server;
   an email server;
   a network gateway server;
   an authentication server; and
   a status management server.

11. A system comprising:
   a database, the database storing security states for each of a plurality of monitored devices;
   a monitoring system, the monitoring system configured to:
      receive a security alert for a device, the device included in the plurality of devices, the security alert identifying an security related threat that occurred during operation of the device; and
      determine that the security related threat is of a sufficient priority to investigate by analyzing the security alert in view of stored security states;
   a case management system, the case management system configured to investigate security related threats the occur during operation of the plurality of devices, including:
      open an investigation for a security related threat;
      create a case object for the investigation, the case object being a storage object configured to store information associated with the security related threat;
      formulating a request to send to at least one device from among the one or more devices to request additional information associated with the security related threat, including:
         identify a plurality of assets related to the investigation;
         add a modifier to the request to request that additional information be returned with a specified level of detail;
      send the formulated request to the at least one device to request the additional information about the plurality of assets be returned to the computer system with the specified level of detail;
      receive one or more responses from the at least one device, the one or more responses responsive to the formulated request, the one or more responses including the additional information about the plurality of assets, the additional information related to the investigation and having the specified level of detail;
      update the case object by storing the additional information received in the one or more responses in the case object;
      draw a conclusion with respect to the security related issue by analyzing the updated case object;
      automatically and iteratively refine the updated case object by:
         analyzing the updated case object;
         based on the analysis, automatically and without user intervention, issuing one or more additional requests for further information to the at least one device, the one or more additional requests changing the modifier to request that the further information have a different specified level of detail;
         receiving the further information from the at least one device; and
         refining the case object by consolidating the further information along with the additional information in the case object; and
      draw a further conclusion with respect to the security related issue by analyzing the consolidated information in the refined case object.

12. The system of claim 11, the case management system further comprising automated analysis logic configured to generate a second request based on the received one or more responses.

13. The system of claim 11, the case management system further configured to automatically formulate the request.

14. The system of claim 11 further comprising:
   a user interface configured to transmit a command to formulate the request and to display at least a portion of the case object.

15. A computer program product for use at a computer system, the computer program product for implementing a method for investigating a security related issue, the computer program product comprising one or more computer storage devices having stored thereon computer executable instructions that, when executed, cause the computer system to perform the method including the following:
   receive a selection of a security alert for a device, the device included in the plurality of devices, the security alert identifying an security related threat that occurred during operation of the device;
   investigate the security related issue in response receiving the selection of the security alert, including:
      open an investigation for the security related issue;
      create a case object for the investigation, the case object being a storage object configured to store information associated with the security related issue;
      formulate a request to send to at least one device from among the one or more devices to request additional information associated with the security related issue, including:
         identify a plurality of assets related to the investigation;
         add a modifier to the request to request that additional information be returned with a specified level of detail;
      send the formulated request to the at least one device to request the additional information about the plurality of assets be returned to the computer system with the specified level of detail;
      receive one or more responses from the at least one device, the one or more responses responsive to the formulated request, the one or more responses including the additional information about the plurality of assets, the additional information related to the investigation and having the specified level of detail;
      update the case object by storing the additional information received in the one or more responses in the case object;
      present at least a portion of the updated case object on a user interface to help a user draw a conclusion with respect to the security related issue;
      automatically and iteratively refine the updated case object by:
         analyzing the updated case object;
         based on the analysis, automatically and without user intervention, issuing one or more additional requests for further information to the at least one device, the one or more additional requests changing the modifier to request that the further information have a different specified level of detail;
receiving the further information from the at least one device; and
refining the case object by consolidating the further information along with the additional information in the case object; and
draw a further conclusion with respect to the security related issue by analyzing the consolidated information in the refined case object.

16. The computer program product of claim 15, further comprising computer executable instructions that, when executed, cause the computer system to:
formulate a further request to send to the at least one device to request further information associated with the security related issue, including:
add a further modifier to the further request to request that further information be returned with a different specified level of detail;
send the further request to the at least one device to request the further information about the plurality of assets be returned to the computer system with the different specified level of detail;
receive one or more further responses from the at least one device, the one or more further responses responsive to the further request, the one or more further responses including the further information about the plurality of assets, the further information related to the investigation and having the different specified level of detail; and
further update the updated case object by storing the further information in the updated case object.

17. The computer program product of claim 15, further comprising computer executable instructions that, when executed, cause the computer system to:
compare the updated case object with a second case object to determine at least one similarity between the updated case object and the second case object.

18. The computer program product of claim 15, further comprising computer executable instructions that, when executed, cause the computer system to sanitize the updated case object by:
identifying an asset identifier in the updated case object; and
replacing the asset identifier with a token for each instance of the asset identifier in the updated case object.

19. The computer program product of claim 15, further comprising computer executable instructions that, when executed, cause the computer system to add a second modifier to the request to request that returned additional information have specific properties, including requesting one or more of: the additional information be within a specified time range, the additional information have a specified session descriptor, and the additional information have specified communication parameters.

20. The computer program product of claim 15, wherein computer executable instructions that, when executed, cause the computer system to identify the one or more devices comprise computer executable instructions that, when executed, cause the computer system to identifying one or more of:
a messaging server;
an email server;
a network gateway server;
an authentication server; and
a status management server.

* * * * *